United States Patent
Vigneras et al.

(10) Patent No.: US 9,866,437 B2
(45) Date of Patent: Jan. 9, 2018

(54) METHODS AND SYSTEMS OF MANAGING AN INTERCONNECTION NETWORK

(71) Applicant: BULL SAS, Les Clayes-Sous-Bois (FR)

(72) Inventors: Pierre Vigneras, Angervilliers (FR); Sebastien Miquee, Arpajon (FR)

(73) Assignee: BULL SAS, Les Clayes-Sous-Bois (FR)

( * ) Notice: Subject to any disclaimer, the term of this patent is extended or adjusted under 35 U.S.C. 154(b) by 260 days.

(21) Appl. No.: 14/706,254

(22) Filed: May 7, 2015

(65) Prior Publication Data

US 2015/0365284 A1 Dec. 17, 2015

(30) Foreign Application Priority Data

Jun. 13, 2014 (FR) ...................... 14 55446

(51) Int. Cl.
| | |
|---|---|
| *H04L 12/24* | (2006.01) |
| *H04L 29/08* | (2006.01) |
| *H04L 12/26* | (2006.01) |
| *G06F 9/54* | (2006.01) |

(52) U.S. Cl.
CPC .......... *H04L 41/0816* (2013.01); *G06F 9/542* (2013.01); *H04L 41/024* (2013.01); *H04L 41/042* (2013.01); *H04L 41/0806* (2013.01); *H04L 41/12* (2013.01); *H04L 43/0817* (2013.01); *H04L 67/1095* (2013.01); *H04L 67/26* (2013.01)

(58) Field of Classification Search
CPC ....... G06F 9/4856; G06F 9/542; G11B 27/36; H04L 67/025; H04L 67/02; H04L 67/10; H04L 67/34; H04L 41/0816; H04L 41/024; H04L 41/12; H04L 41/0806; H04L 41/042; H04L 41/0817; H04L 67/26; H04L 67/1095; H04W 4/001

See application file for complete search history.

(56) References Cited

U.S. PATENT DOCUMENTS

| | | | | |
|---|---|---|---|---|
| 2009/0276771 | A1* | 11/2009 | Nickolov | G06F 9/4856 717/177 |
| 2013/0318199 | A1* | 11/2013 | Le Jouan | H04L 67/02 709/217 |
| 2014/0280913 | A1* | 9/2014 | Karren | H04W 4/001 709/224 |
| 2014/0304326 | A1* | 10/2014 | Wesley | H04L 67/10 709/203 |

(Continued)

*Primary Examiner* — Le H Luu
(74) *Attorney, Agent, or Firm* — Sughrue Mion, PLLC

(57) ABSTRACT

A server (10) of a system for managing an interconnection network, said server comprising:
- a key-value associative data structure (2) configured to store a global state of the interconnection network;
- the following connection interfaces (3-6):
  - a configuration server interface (3) configured to communicate, in response to a configuration request to join the management system, the configuration of said management system;
  - a publication server interface (4) configured to disseminate an update in the key-value associative data structure (2);
  - a collection server interface (5) configured to update, in response to a request for update, the key-value associative data structure (2);
  - a snapshot server interface (6) configured to communicate, in response to a request for snapshot, a snapshot of a subset of the global state.

16 Claims, 2 Drawing Sheets

(56) References Cited

U.S. PATENT DOCUMENTS

| | | | |
|---|---|---|---|
| 2015/0117174 A1* | 4/2015 | Alber | G11B 27/36 369/53.41 |
| 2015/0188777 A1* | 7/2015 | Frost | H04L 67/34 709/223 |
| 2015/0334162 A1* | 11/2015 | Krishnamurthy | H04L 67/025 715/740 |

* cited by examiner

METHODS AND SYSTEMS OF MANAGING AN INTERCONNECTION NETWORK

This application claims priority from French Patent Application No. 14 55446 filed Jun. 13, 2014, the contents of all of which are incorporated herein by reference in their entirety.

The invention concerns a management system for managing an interconnection network.

"Interconnection network" is understood here as any dedicated computer network (such as an InfiniBand network), or more generally, any collection of computer elements, particularly distributed processors, with physical communication links between them.

A management system utilizing a secondary network, which can be of the Ethernet type, is configured to manage this computer network in an out-of-band mode.

However, with the growth of the size of supercomputers, the topologies of high-performance computer networks are becoming denser and more complex. The result is that the out-of-band management, by means of a dedicated management network also called "secondary network," of the interconnection network of a supercomputer requires more than one component in order to:
  react to events that could occur in said interconnection network (failures of cables, ports, switches or nodes, for example);
  verify any changes of the topology related to changes of cables or switches (connectivity, conformity to theoretical topologies);
  calculate new routing tables based on changes and updates loaded into the switches.

Moreover, for purposes of upscaling and ruggedness, each of the aforementioned tasks is to be done by separate processes, potentially from different dedicated machines. To that end, an efficient communication mechanism allows these components to share a common global state when dialoguing. Said mechanism should be provided by the management system. The messages are exchanged on the secondary network (or management network) of the interconnection network of the supercomputer. The management system allows the processes responsible for management of the interconnection network to communicate and to share a global state, a subset of which represents the state of the interconnection network of the supercomputer (i.e., all of the statuses of the equipment that comprises the interconnection network of the supercomputer).

In order to ensure communication between the processes being executed on different machines of the management network, said management network must, in particular:
  be able to support a large number of processes (several hundreds and even several thousands);
  allow a process to join or leave the management system at any time (because of failure or update, for example);
  keep a global state of the interconnection network of the supercomputer up to date;
  maintain a consistent global state (eventual consistency) of the interconnection network of the supercomputer;
  represent this global state in the form of a "key-value"-type table;
  share said global state between the different interconnected processes of the management system;
  enable, at any time, each of the processes of the management system to update a subset or even the entire global state of the interconnection network;
  manage the frequency of updates of the global state (preferably a maximum of several hundred per second);
  limit access to the global state, since certain processes should only see a subset of the global state;
  be able to hold the global state in random-access memory, even if it can have a relatively large number of entries (generally, several hundreds of thousands).

In that regard, there are systems for sharing states such as distributed hash tables. However, none of the existing solutions meets all of the aforementioned requirements that should be met by a management system. In this instance, a distributed hash table cannot offer the last two obligations mentioned above.

An object of the present invention is to propose an interprocess communication mechanism in the form of a management system that meets the aforementioned requirements.

Another intention of the present invention is to propose a client/server-type communication architecture in order to interconnect distributed processes.

Another object of the present invention is to propose a system managing an interconnection network based on an interprocess communication.

Another object of the present invention is to propose an asynchronous and disconnected interprocess communication mechanism.

Another intention of the present invention is to propose a method for managing the interconnection network of a supercomputer.

To those ends, the invention relates, according to a first aspect, to a server of a system for managing an interconnection network, said server comprising:
  a key-value associative data structure configured to store a global state of the interconnection network;
  the following connection interfaces:
    a configuration server interface configured to communicate to a client, in response to a configuration request from said client to join the management system, the configuration of said management system;
    a publication server interface configured to disseminate, to a client connected to the management system, an update in the key-value associative data structure;
    a collection server interface configured to update, in response to a request for update from a client process connected to the management system, the key-value associative data structure;
    a snapshot server interface configured to communicate, in response to a request for snapshot from a client process connected to the management system, a snapshot of a subset of the global state to said client process, said global state being stored in the key-value associative data structure.

The server of a management system of an interconnection network has, according to various embodiments, the following features, which may be combined:
  the configuration server interface is configured to communicate the address of the publication server interface, the address of the collection server interface, and the address of the snapshot server interface;
  the key-value associative data structure is a hash table;
  the implementation of said server, in order to react to the configuration request, request for update or snapshot request, is based on the connection server interface event paradigm, said connection server interface being the configuration server interface, collection server interface or snapshot server interface.

According to a second aspect, the invention relates to a client of a system for managing an interconnection network, said client comprising:
- a client process;
- a snapshot client interface configured to retrieve, from a server of the management system, a snapshot of a subset of the global state of the interconnection network;
- a subscription client interface configured to receive, from the server of the management system, an update of the global state of the interconnection network;
- a configuration client interface configured to retrieve, from the server of the management system, the configuration of the management system;
- a publication client interface so that the client process can publish an update of the global state of the interconnection network, said global state of the interconnection network being shared and stored by the server of the management system.

The client of a system for managing an interconnection network further comprises a business process, said business process being provided with a publication client interface associated with said business process in such a way that said business process can publish an update of the global state of the interconnection network.

Advantageously, the data published by the client process is a message in the form of a "key-value" message.

According to a third aspect, the invention relates to a management system for managing an interconnection network comprising the server and the client introduced above.

According to a fourth aspect, the invention relates to a supercomputer comprising an interconnection network and the management system cited above.

Moreover, the supercomputer comprises:
- a topology manager configured to verify the topology of the interconnection network;
- a supervision module configured to retrieve an alarm sent by network equipment of the interconnection network, and as a result, to update the management system;
- a routing calculator configured to calculate a routing table for data received from the management system.

Other objects and advantages of the invention will be seen from the description of the embodiments provided hereinbelow with reference to the appended drawings in which.

The system for managing an interconnection network is based on a client/server-type network architecture implementing different communication paradigms depending on the connection interfaces.

Figure 1:
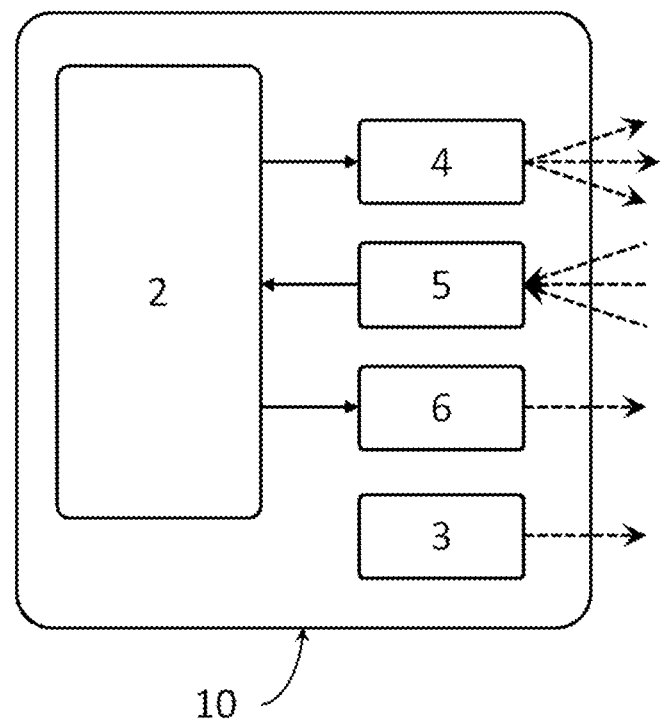
FIG. 1 illustrates a server of a management system according to one embodiment.

With reference to FIG. 1, the server side (or the server implementation) of this network architecture of the management system comprises a server 10 of the management network.

The server 10 is configured to hold the global state of the interconnection network. Said global state comprises information concerning the interconnection network of the supercomputer. Said global state is stored in a key-value associative data structure 2. Said data structure 2 is stored in a random-access memory of the server 10.

The key-value associative data structure 2 is a data container, preferably local to the server 10, which has a particular protocol for adding, withdrawing and searching for elements. Said key-value associative data structure 2 associates a key with a value. The uniqueness of the keys should be ensured by the sender processes. If an already-existing key is updated, the former value is overwritten by the new one.

In one embodiment, the key-value associative data structure 2 is an associative table, also called hash table or hashmap, having a predefined association or hashing function. Advantageously, said particular data structure enables quick access to a value as a function of a key.

The server 10 of the management network further comprises:
- a configuration server interface 3 configured to manage configuration request(s) from a client wishing to join the management system;
- a publication server interface 4 configured to disseminate, to clients connected to the management system, updates taking place in the key-value associative data structure 2, i.e., an entry of the key-value associative data structure 2;
- a collection server interface 5 configured to manage the requests for updates (generally, updates in the form of a key-value message) originating from client processes connected to the management system;
- a snapshot server interface 6 configured to send the current state, i.e., a snapshot of the set or only a subset of the key-value associative data structure 2 (filtering capable of being accomplished at the server 10, in order to limit the use of the bandwidth), in response to a request for snapshot originating from a client process connected to the management system.

The configuration server interface 3 enables the configuration of the management system to be communicated to a client wishing to join said management system of the interconnection network. The configuration sent comprises, in particular, the addresses (or URL for "Uniform Resource Locator") of the other connection interfaces cited above, namely the publication server interface 4, the collection server interface 5, and the snapshot server interface 6.

Preferably, the connection server interfaces 3-6 are ZeroMQ sockets (the document at the link http://zeromq.org/intro:read-the-manual specifies the ZeroMQ or ZMQ sockets). Indeed, this embodiment makes it possible to avoid the problems of the request/response paradigm.

It should be noted that in the server implementation of the management system represented in FIG. 1:
- the configuration server interface 3 does not interact with the key-value associative data structure 2;
- the collection server interface 5 interacts with said key-value associative data structure 2 in write mode in order to store key-value entries therein;
- the publication server interface 4 and the snapshot server interface 6 interact with the key-value associative data structure 2 in read mode.

Said server implementation of the management system can be produced in C language, Python or any other appropriate programming language, and it can also be in mono-thread or multi-thread mode.

In a mono-thread implementation of the server 10, the server executes the following loop, based on the connection server interface event paradigm 3, 5, 6,

```
IF True
    ACCORDING TO "connection server interface"
        CASE    "configuration server interface"
                send the configuration data via the configuration server
                interface
        CASE    "collection server interface"
                send the update via the publication server interface
                update the data structure 2
        CASE    "snapshot server interface"
                send a snapshot via the snapshot server interface
        CASE    "the timeout interval has expired"
                send a presence message
    END
END
```

Advantageously, this implementation based on the connection server interface event paradigm 3, 5, 6 makes it possible to react quickly to an action from a client process (request or update). The conditional instruction "ACCORDING TO" manages the three connection server interfaces (configuration 3, collection 5 and snapshot 6) and a predefined waiting time (a timeout). It returns a list comprising the connection interface(s) triggered by an event of a connection server interface 3, 5, 6. If no event occurs when the timeout has expired, the server 10 sends to the management system clients a presence message (called heartbeat message).

The particular order in which the connection server interfaces 3, 5, 6 are processed allows:
    firstly, a client to connect to the server 10 and to be configured by means of addresses (URLs) of other connection server interfaces 4-6 that are communicated to it via the configuration server interface 3;
    secondly, if the client automatically sends (pushes) an update, to take into account said update as soon as possible by the server 10 and to publish it to all of the clients (including the one that has originated said update), said update being able to trigger the actions in other clients of the management system;
    thirdly, a request for a snapshot to be processed last because it generally takes the most time to execute.

Advantageously, in a mono-thread implementation of the server 10, a locking mechanism to prevent simultaneous and concurrent access to the data structure 2 and/or simultaneous utilization of a connection server interface 3-6 is not necessary.

The server 10 of the management system receives and processes key-value-type entries that can be interpreted as orders. These entries can originate from a client of the management system. Advantageously, this makes it possible to have cached entries, particularly when the data structure 2 is written in system files (the case of a UNIX-based system, for example).

Figure 2:
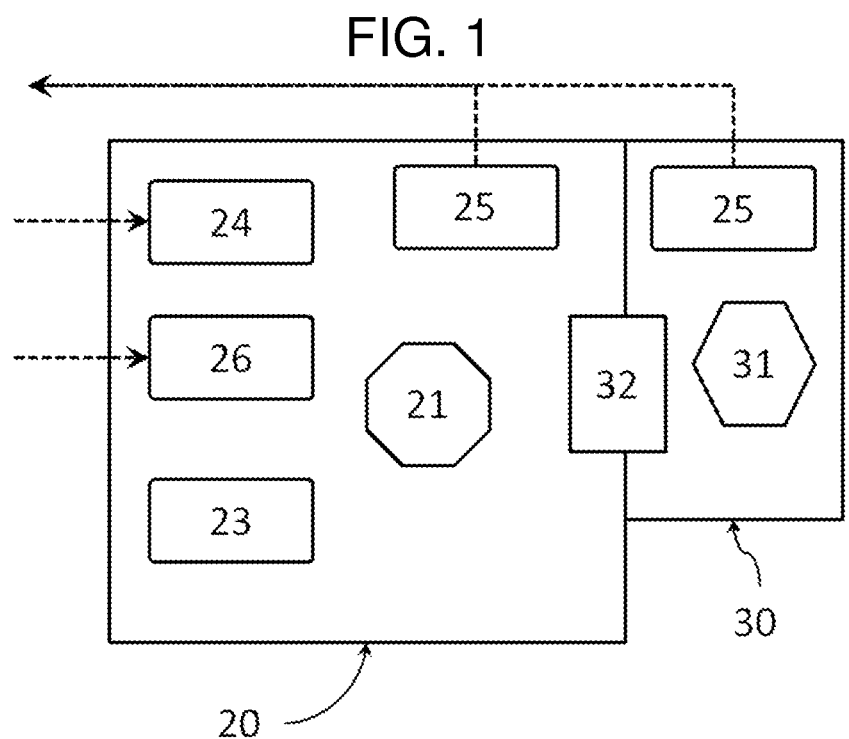
FIG. 2 illustrates a client of a management system according to one embodiment.

FIG. 2 illustrates a client implementation or the "client side" of the client-server architecture of the management system of an interconnection network.

A client 20 of the management system is understood here as a client process 21, which is generally configured to support at least one business process 31 for the execution of a business code 30.

The client 20 of the management system of an interconnection network comprises:
    a snapshot client interface 26 configured to retrieve a snapshot of the global state of the interconnection network, or of a subset thereof;
    a subscription client interface 24 configured to receive updates from the server of the management system;
    a configuration client interface 23 configured to retrieve the configuration of the server of the management system, in particular the addresses (URLs) of the connection server interfaces of the server;
    a plurality of publication client interfaces 25 so that the client process 21 and any other business process 31 of a business code 30 can publish, by means of "key-value" entities, updates of (or, more generally, data concerning) their respective states via an appropriate publication client interface 25. It should be noted that a business code 30 can comprise, for its own purposes, more than one business process 31 to which a publication client interface 25 is associated;
    a communication client interface 32 between the business process 31 of the business code 30 and the client process 21.

The client process 21 manages the incoming communications from the client 20 of the management system. For this purpose, said client process 21 has its own input client interfaces 24 and 26, namely that of the snapshot 26 and that of the subscription 24.

The publication client interface 25 allows a business process 31 to update the global state of the interconnection network that is shared and stored on the server side.

Figure 3:
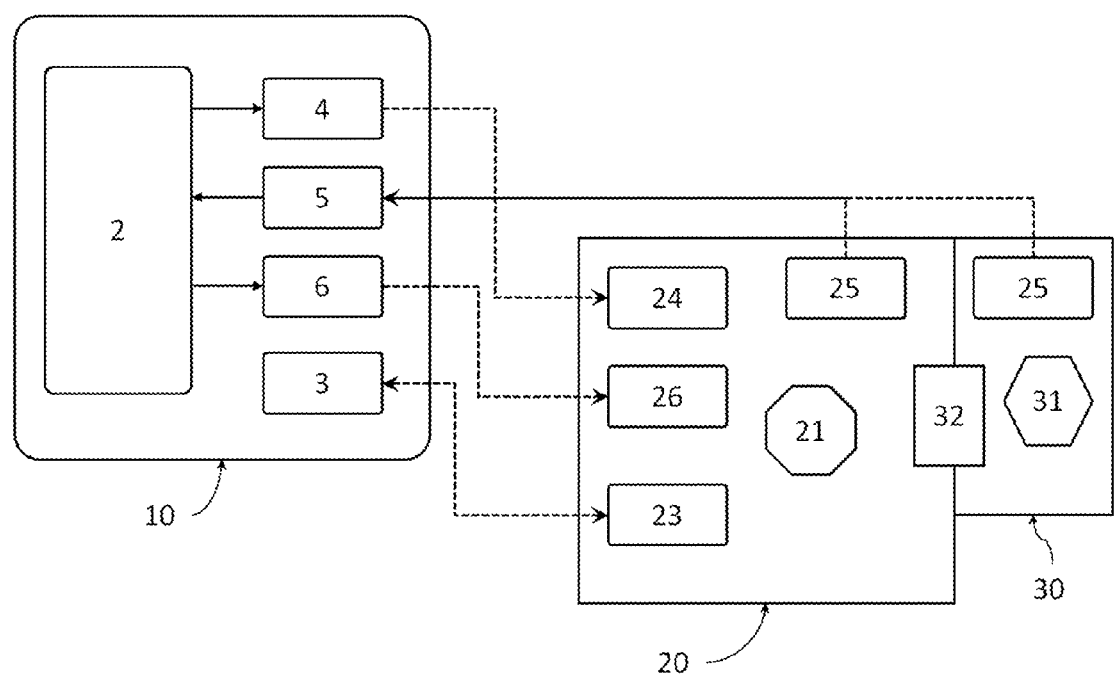
FIG. 3 illustrates the implementation of a management system according to one embodiment.

In FIG. 3, the client 20 is connected to the server 10 of the management system.

In order to be connected to the server 10, the client 20 is connected first to the configuration server interface 3 in order to receive all of the configuration parameters from the management system, including in particular the addresses (URLs) of the other connection server interfaces 4-6 of the server 10. In one embodiment, upon receipt on the configuration server interface 3 of a configuration request (for example, of the CONFIG? type), the server 10 (see the link between the connection interfaces 3 and 23):
    communicates via the configuration server interface 3, in response to said request, the addresses (URLs) of the other three connection interfaces 4-6; and
    sends, via said configuration server interface 3, a message indicating the end of the configuration step (for example, of the type End_CONFIG).

Upon receipt of the configuration parameters, the client 20 decides whether or not to retrieve a snapshot of the current global state of the interconnection network (see the link between the connection interfaces 6 and 26). If so:
    the client 20 requests, from the snapshot server interface 6, a snapshot of the global state of the interconnection network that is stored in the key-value associative data structure 2;
    the server 10 waits for the client 20 to receive the hierarchies to which it wishes to be subscribed (in particular, said hierarchies can be different from those specified during a connection to the publication server interface 4 of the server 10). Then, the server 10 sends to the client 20, using the snapshot server interface 6, a snapshot of the status of the requested hierarchies;
    the server 10 sends the current revision number of the key-value associative data structure 2.

Accordingly, the client 20 is responsible for connecting to the publication server interface 4 (see the link between the connection interfaces 4 and 24) in order to receive updates, and to the collection server interface 5 (see the link between the connection interfaces 5 and 25) to possibly send updates (or new entries).

Preferably, the updates published by the server 10 are timestamped. Advantageously, the timestamping on the server side guarantees consistency over time (eventual consistency) of the global state within each client 20. It should be noted that a client 20 can ignore updates sent during the retrieval of a snapshot when said updates are prior to (thanks to the timestamping) the snapshot received.

Beyond the connection time of a client 20, the server 10 is configured to react to each request for update and to regularly send presence (heartbeat) messages.

Upon receipt of a request for update, or more generally, of a command, via the collection server interface 5:
- if said command does not concern the server 10 or if it is not a special command (such as a shutdown command), it is transferred to the other clients via the publication server interface 4;
- the server 10 applies the contents of said request for update to the data structure 2. In the case of a command message from the server, said message is first compared to the "purge" command that requires the deletion of all the contents of the data structure 2.

By using the special input data fields, such as "purge" or "TTL" for "time to live," the server 10 can delete this input data from the local data structure 2. Otherwise, if no input data exists, then it is added or updated in the data structure 2.

Following are examples of requests that the server 10 can receive:
- .bbctrl/_server_kill_: request the server 10 to exit (this message is not broadcast by the server 10);
- .bbctrl/_clear_all_: request the server 10 and all clients to delete all of the contents of the data structure (this message is broadcast by the server 10);
- .bbctrl/_hugz_: a presence message by the server.

The basic entity here is a message based on the "key-value" paradigm. This entity, in addition to the key-value pair, provides other information such as the number of the sequence, the unique universal identifier of that entity, the identity of the sender thereof, or the time to live of the entity.

This information can be sent in one or more data frames. Preferably, said information is sent in a first frame containing the key for the subscription mechanism, and a second frame containing the rest of the information (data, identifier of the sender, sequence number, for example).

Preferably, a dynamic downtime is calculated before the probe of the collection server interface 5 initiates a period of inactivity.

Advantageously, the server implementation 10 of the management network makes it possible:
- to furnish configuration data to the clients;
- to furnish snapshots of the global state of the interconnection network to the newly connected clients of the management system; and
- to transfer updates in the global state of the interconnection network to all clients connected to the management system.

In one embodiment, the management system is used for managing the interconnection (or computing) network of a supercomputer. For this purpose, the following modules can be required:
- a topology manager responsible for verifying the topology (the status of the equipment for example, or the connection schema of the equipment) of the interconnection network;
- a supervision module responsible for retrieving alarms sent by the different pieces of network equipment of the supercomputer (particularly, the switches), for correlating them in order to update the management system with pertinent data (status updates, for example);
- a routing calculator responsible for calculating routing tables for data received from the management system.

When the additional components cited above start up, the server 10 of the management network is already present so that all of the data published by the topology manager can be retrieved by the other clients of the server 10.

Advantageously, the status updates are done one by one, and after aggregation, a special key, called trigger element, is sent. Upon receipt of said trigger element, the routing calculator triggers its phase of calculating new routing tables. Thus, it is possible to easily and quickly differentiate the different types of messages sent by the server of the management system:
- updates of the global state of the interconnection network;
- trigger elements enabling an action to be triggered.

This advantageously results in an aggregation of the events in order to gain efficiency. In particular, the routing calculator does not calculate the routing tables for each change of status of a single piece of equipment.

In this regard, a mechanism based on prefixes of keys makes it possible not only for each client to be subscribed to a subset of the global state, but also to make this differentiation. Moreover, said mechanism makes it possible to add, in the management system, other types of information that are found in specific subsets. For example, the following prefixes can be utilized in a management system:
- @interconnect/: all of the inputs concerning the status of the equipment of the interconnection network;
- !triggers/: all of the inputs pertaining to trigger elements;
- /mngt/: all of the inputs containing information for connection to the various pieces of equipment of the interconnection network;
- .bbctrl/: all of the inputs allowing control of the management system, on the client side as well as the server side (for example, a command to delete the whole data table).

Advantageously, the different embodiments described above utilize different communication paradigms depending on the connection interfaces. For example, the publication server interface 4 of the server 10 operates in "broadcast" mode and can use a "multicast" protocol (symmetrical with the subscription server interface 24 of the side of the client 20). Moreover, a client 20 can subscribe to one or more prefixes of keys, which can enable it to retrieve only a subset of the global state stored in the data structure 2.

The invention claimed is:

1. A server device (10) of a system for managing an interconnection network, said server device comprising:
- a key-value associative data structure (2) configured to store a global state of the interconnection network;
- a memory;
- a processor coupled to the memory and configured with processor-executable instructions stored on the memory to perform a plurality of server interfaces (3-6) related operations, said server interfaces comprising:
  - a configuration server interface (3) configured to communicate to a client (20), in response to a configuration request from said client (20) to join the management system, the configuration of said management system;
  - a publication server interface (4) configured to disseminate, to a client (20) connected to the management system, an update in the key-value associative data structure (2);
  - a collection server interface (5) configured to update, in response to a request for update from a client process (21) connected to the management system, the key-value associative data structure (2);

a snapshot server interface (6) configured to communicate, in response to a request for snapshot from a client process (21) connected to the management system, a snapshot of a subset of the global state to said client process (21), said global state being stored in the key-value associative data structure (2).

2. The server device (10) according to claim 1, wherein the configuration server interface (3) is configured to communicate the address of the publication server interface (4), the address of the collection server interface (5), and the address of the snapshot server interface (6).

3. The server device (10) according to claim 1, wherein the key-value associative data structure (2) is a hash table.

4. The server device according to claim 1, wherein the implementation of said server device, in order to react to the configuration request, request for update or snapshot request, is based on the connection server interface event paradigm, said connection server interface being the configuration server interface (3), collection server interface (5) or snapshot server interface (6).

5. The server device according to claim 1, wherein the configuration server interface, the publication server interface, the collection server interface, and the snapshot server interface are ZeroMQ socket interfaces.

6. The server device according to claim 5, wherein the address of the publication server interface is a uniform resource locator (URL) of the publication server interface accessible to the client, the address of the collection server interface is a URL of the collection server interface accessible to the client process, and the address of the snapshot server interface is a URL of the snapshot server interface accessible to the client process.

7. The server device according to claim 6, wherein the configuration server interface does not interact with the key-value associative data structure, the collection server interface interacts with the key-value associative data structure only in a write mode to store key-value entries therein, and the publication server interface and the snapshot server interface interact with the key-value associated data structure only in a read mode to read key-value entries therein.

8. A client device (20) of a system for managing an interconnection network, said client device comprising:
  a client process (21);
  a memory;
  a processor coupled to the memory and configured with processor-executable instructions stored on the memory to perform a plurality of client interfaces (23-26) related operations, said client interfaces comprising:
  a snapshot client interface (26) configured to retrieve, from a server device of the management system, a snapshot of a subset of the global state of the interconnection network;
  a subscription client interface (24) configured to receive, from the server device of the management system, an update of the global state of the interconnection network;
  a configuration client interface (23) configured to retrieve, from the server device of the management system, the configuration of the management system;
  a publication client interface (25) so that the client process (21) can publish an update of the global state of the interconnection network, said global state of the interconnection network being shared and stored by the server device of the management system.

9. The client device according to claim 8, further comprising a business process, said business process being provided with a publication client interface (25) associated with said business process in such a way that said business process can publish an update of the global state of the interconnection network.

10. The client device according to claim 8, wherein the published update is a message in the form of a "key-value" message.

11. The client device according to claim 8, wherein the snapshot client interface, the subscription client interface, the configuration client interface, and the publication client interface are ZeroMQ socket interfaces.

12. The client device according to claim 11, wherein the configuration of the management system comprises: a uniform resource locator of a publication server interface accessible to the subscription client interface, a URL of a collection server interface accessible to the publication client interface, and a URL of a snapshot server interface accessible to the snapshot client interface.

13. The client device according to claim 12, wherein the configuration client interface interacts to receive the configuration of the management system with a configuration server interface that does not interact with a key-value associative data structure configured to store a global state of the interconnection network, the subscription client interface interacts to receive updates of the global state of the interconnection network with the publication server interface that interacts with the key-value associated data structure only in a read mode to read key-value entries therein, the publication client interface interacts with the collection server interface that interacts with the key-value associative data structure only in a write mode to store key-value entries therein, and the snapshot client interface interacts with the snapshot server interface to receive an update of the global state of the interconnection network.

14. A management system for managing an interconnection network, the interconnection network comprising:
  a server device comprising:
    a key-value associative data structure configured to store a global state of the interconnection network;
    a memory;
    a processor coupled to the memory and configured with processor-executable instructions stored on the memory to perform a pluarlity of server interfaces (3-6) related operations, said server interfaces comprising:
      a configuration server interface configured to communicate to a client, in response to a configuration request from said client to join the management system, the configuration of said management system;
      a publication server interface configured to disseminate, to a client connected to the management system, an update in the key-value associative data structure;
      a collection server interface configured to update, in response to a request for update from a client process connected to the management system, the key-value associative data structure;
      a snapshot server interface configured to communicate, in response to a request for snapshot from a client process connected to the management system, a snapshot of a subset of the global state to said client process, said global state being stored in the key-value associative data structure.

15. A supercomputer comprising:

a management system for managing an interconnection network, the interconnection network comprising:

a server device comprising:

a key-value associative data structure configured to store a global state of the interconnection network;

a memory;

a processor coupled to the memory and configured with processor-executable instructions stored on the memory to perform a pluraity of server interfaces (3-6) related operations, said server interfaces comprising:

a configuration server interface configured to communicate to a client, in response to a configuration request from said client to join the management system, the configuration of said management system;

a publication server interface configured to disseminate, to a client connected to the management system, an update in the key-value associative data structure;

a collection server interface configured to update, in response to a request for update from a client process connected to the management system, the key-value associative data structure;

a snapshot server interface configured to communicate, in response to a request for snapshot from a client process connected to the management system, a snapshot of a subset of the global state to said client process, said global state being stored in the key-value associative data structure.

16. The supercomputer of claim 15 further comprising:

a topology manager configured to verify the topology of the interconnection network;

a supervision module configured to retrieve an alarm sent by network equipment of the interconnection network, and as a result, to update the management system;

a routing calculator configured to calculate a routing table for data received from the management system.

* * * * *